United States Patent [19]

Tupper

[11] 4,012,973

[45] Mar. 22, 1977

[54] TIRE CUTTING APPARATUS

[75] Inventor: Myron D. Tupper, Sandy, Oreg.

[73] Assignee: Tiregon, Inc., Portland, Oreg.

[22] Filed: Sept. 22, 1975

[21] Appl. No.: 615,550

[52] U.S. Cl. .................................... 82/82; 82/86; 82/101; 157/13

[51] Int. Cl.² ...................... B23B 3/04; B23B 5/14; B29H 21/08

[58] Field of Search .............. 82/46, 54, 59, 60, 58, 82/79, 80, 82, 83, 101, 86; 157/13

[56] References Cited

UNITED STATES PATENTS

| | | | |
|---|---|---|---|
| 1,971,582 | 8/1934 | Scruby | 157/13 |
| 2,794,503 | 6/1957 | Kraft | 157/13 |
| 3,584,673 | 6/1971 | Lehmann | 157/13 |
| 3,635,610 | 1/1972 | Hall et al. | 157/13 X |
| 3,701,296 | 10/1972 | Snow | 82/54 |
| 3,830,120 | 8/1974 | Peterson | 82/54 |
| 3,851,697 | 12/1974 | Nishimura | 157/13 |

*Primary Examiner*—Harrison L. Hinson
*Attorney, Agent, or Firm*—Kolisch, Hartwell, Dickinson & Stuart

[57] ABSTRACT

Apparatus for cutting tire casings. A cutter engages the crown of a tire casing from one side, while the crown is supported by crown support means on its opposite side. Guide means cooperating with the crown support means holds the tire casing while cutting progresses. A biased knife acts as the cutter which cuts the casing from the inside.

8 Claims, 4 Drawing Figures

TIRE CUTTING APPARATUS

This invention relates to apparatus for cutting tire casings, and more particularly, to such apparatus which is effective to sever a tire casing with a circumferentially extending cut.

Used tire casings present a considerable disposal problem, by reason of the fact that only limited uses have been proposed for whole tire casings and the shape and bulk of a tire casing renders it impossible to nest or stack the casings in a compact manner. It has been recognized that when a tire casing is severed with a cut extending circumferentially of the casing, either to split it or to produce three or more pieces, the casing pieces resulting are more easily handled than whole tire casings by reason of their lighter weight, their greater adaptability to compact stacking, and their better adaptability to other fragmentation processes which might be employed in disposal of the casings, as exemplified by the fragmentation process disclosed in U.S. Pat. No. 3,731,884.

A general object of the invention is to provide improved apparatus for cutting tire casings by severing them circumferentially.

More specifically, an object is to provide such apparatus featuring a smoothly performing cutting operation which easily severs even the larger tire casing sizes.

Another object of the invention is to provide apparatus of the type described which provides advantages with respect to the loading of a tire casing in the apparatus to prepare the casing for the cutting operation.

A feature and advantage of a preferred embodiment of the invention is a construction which produces cutting of a casing by cutting from the inside out. In this way, the cord structure or the reinforcing fabric normally found in a tire casing is cut first, thus to open up the casing for better cutting of the rubber or other elastomer forming the outer tread in the crown region of a casing.

As will hereinafter become apparent, the apparatus of the invention in a preferred embodiment further features a cutter working in conjunction with guide means bearing on the crown of the casing which is biased in a direction urging further extension from the guide means as cutting progresses, and greater extension into the casing as required. In this connection, and with larger tire casing sizes, usually multiple passes around the tire produce final severance.

According to another feature and object of the invention a knife is employed as the cutter, as such has a good cutting action, particularly in the context of a cutter which cuts from the inside out, the knife having a thin profile which readily accommodates the positioning of the knife within a tire casing and between the side walls thereof.

As further contemplated by a preferred embodiment of the invention, during cutting the tire casing is made to revolve while mounted in the apparatus with successive portions of the crown in the casing moving through a cutting station in the apparatus. In this cutting station, the crown of the casing is supported by a crown support means, more specifically, a powerdriven roller, with such roller having a construction producing optimal driving engagement with the crown of the casing.

These and other objects and advantages of the invention will become more fully apparent as the following description is read in conjunction with the accompanying drawings, wherein.

Figure 1:
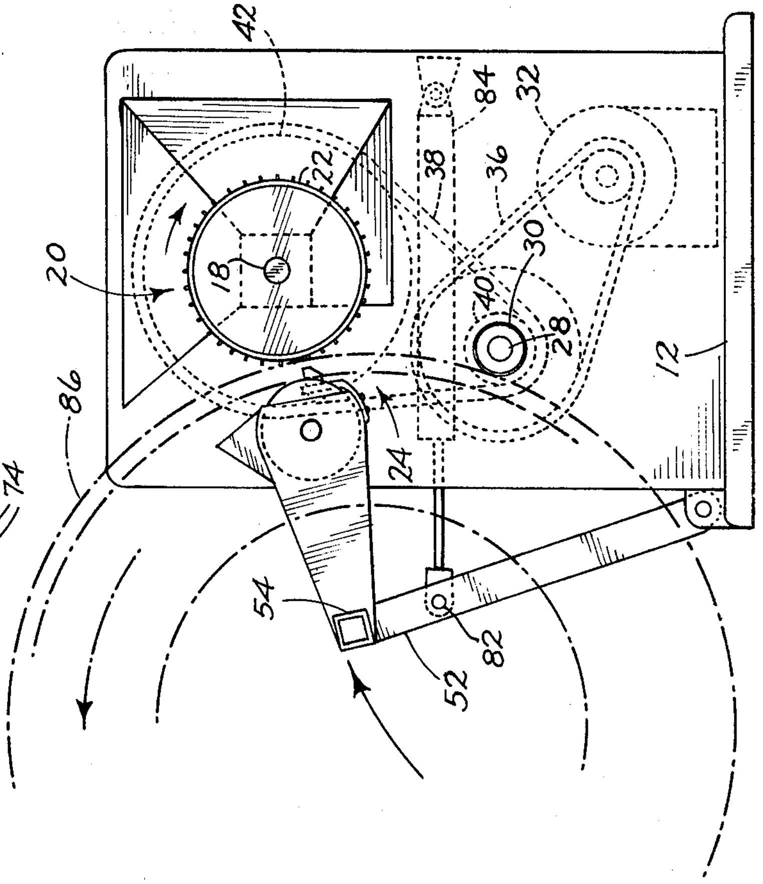
FIG. 1 is an end elevation of apparatus constructed according to the invention, illustrating a cutter and crown support means engaging opposite sides of a crown in a tire casing, the tire casing being depicted in dot-dashed outline.

Referring now to the drawings, the apparatus illustrated comprises a frame shown at 10 including a base 12 which rests on the floor. Housed within a casing 14 are various operating parts of the apparatus.

Journaled on the frame within the casing 14, as by bearing assemblies generally shown at 16, is an upper shaft 18. The right end of this shaft in FIG. 2, or the end of the shaft facing the viewer in FIG. 1, mounts a roller means 20 comprising a pair of spiked wheels 22, each of which is secured to the shaft. During the cutting of a tire casing, roller means 20 supports the crown of the casing in cutting station 24 of the apparatus, the roller means therefore being sometimes referred to herein as a crown support means. As best shown in FIG. 2, the spiked wheels 22 in roller means 20 are spaced a slight distance from each other, which, as will be hereinafter apparent, permits entry of a cutter in the apparatus into the space between the wheels at the conclusion of the cutting operation.

Also mounted on the frame, in bearing assemblies 26, is a lower shaft 28 which generally parallels shaft 18. This shaft also has its right end protruding from casing 14. A knurled roller 30 is secured to this protruding end of shaft 28, with such vertically aligned with roller means 20 viewing the apparatus as shown in FIG. 2.

During operation of the apparatus, roller means 20 and knurled roller 30 are driven under power. A casing being cut has its crown engaging roller means 20 and roller 30 and it is powered movement of these two instrumentalities which produces movement of the crown of the casing through cutting station 24. The motor which produces such powered movement is shown at 32, such having its output shaft 34 connected for driving purposes by belt 36 to shaft 28. Drive is transmitted from shaft 28 to shaft 18 by chain 38 engaging sprockets 40 and 42 secured to these respective shafts. The sprocket diameters are such that the peripheral speed of knurled roller 30 is the same as the peripheral speed of roller means 20.

Shown adjacent base 12 in the apparatus is a rotatably mounted sleeve 50 to which is secured one end of an upwardly extending bar 52 which inclines to the right as shown in FIG. 2. Fastened to the upper extremity of the bar 52 is an arm 54 which projects outwardly from the casing 14 and generally parallels shafts 18, 28. The distal end of arm 54 carries a cutter and guide unit 56.

Figure 3:
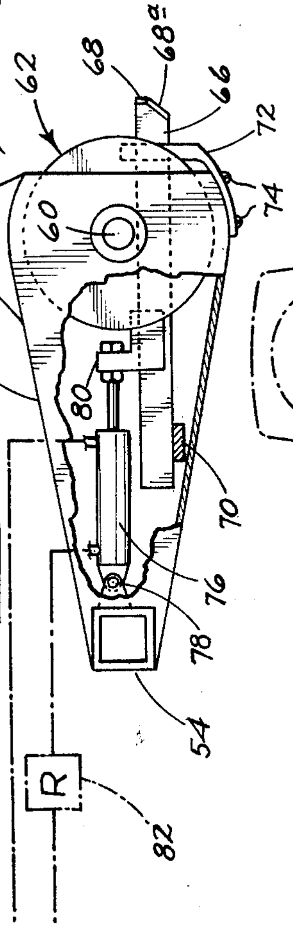
FIG. 3 is a view, on a slightly enlarged scale and with portions broken away, illustrating a cutter and guide unit in the apparatus.
Figure 4:
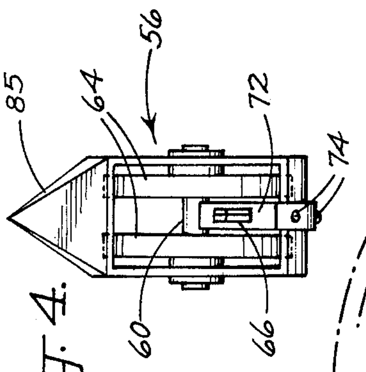
FIG. 4 is an end view of the unit illustrated in FIG. 3.

Considering now in more detail the construction of unit 56, and with reference to FIGS. 3 and 4, the unit includes housing structure 58 providing a protecting enclosure for operating parts of the unit, particularly in the region where the beads of a tire casing tend to bear upon the unit, and which also mounts certain operating parts in the unit.

Rotatably mounted within housing structure 58, as by shaft 60 having ends suitably held by the housing structure, is a guide means 62, more specifically, a pair of laterally spaced guide wheels 64. Portions of these wheels protrude beyond the housing structure, more specifically right-hand portions in FIG. 3, which portions face cutting station 24, these exposed portions of the guide wheels contacting the crown of the casing being cut, in this case the inside of the crown.

An elongate cutter 66, more specifically, an elongate knife having a cutting edge 68 at the end thereof is also mounted within the housing structure. The knife is slidably mounted for movement along its axis, which is to say for extension beyond the exposed portions of guide wheels 64. Toward these ends, the left end of the knife element rests on a wear pad 70 and the opposite extremity adjacent cutting edge 68 is slidably mounted within an accommodating slot provided in knife support 72, such knife support, in effect, being part of the housing structure by reason of its connection to the structure through fasteners 74. The knife is located between the guide wheels 64, as best evident by viewing FIG. 4.

A fluid-operated ram shown at 76 has its cylinder end pivotally connected at 78 to arm 54 and its rod end connected at 80 to cutter 66. As shown schematically in FIG. 3, the ram is connected to a source of fluid under pressure which includes an adjustable regulator 82 effective to maintain a more or less constant pressure in the fluid within the ram producing extension. The ram, therefore, constitutes yieldable means biasing extension of the cutter outwardly beyond guide wheels 64.

Bar 52 and sleeve 50 constitute a mounting for the cutter and guide unit, more specifically, the cutter and guide means included in the unit. The same is swingable counterclockwise in FIG. 1, to move arm 54 and the cutter and guide unit away from the cutting station and the surface of crown support means or roller means 20. This movement is provided in order to accommodate the loading of a tire casing into the apparatus preparatory to the cutting thereof. A double-acting ram 84 with its cylinder end mounted on frame 10 and its rod end connected at 82 to bar 52 provides a power-operated means for swinging the cutter and guide unit to the left and away from the roller means 20 preparatory to the loading of the tire casing, and for then swinging the bar 52 in the opposite direction to commence the cutting of the casing. The fluid supply for ram 84 also includes an adjustable regulator whereby a yieldable controlled substantially constant force is exerted on unit 56 urging the unit toward the tire casing.

It will be noted that housing structure 58 includes at the top thereof in the drawings a deflector 85 of approximately pyramidal shape. When mounting a tire casing on the apparatus such is conveniently used initially to insert the cutter and guide unit between the side walls of the casing. The insertion of the deflector produces deflection of the beads and side walls away from each other, whereby a casing, as exemplified by casing 86 shown, may be finally positioned as shown in FIGS. 1 and 2, with the region of the cutter and guide unit containing the protruding cutter and guide wheels adjacent the back of the crown in the casing and between the side walls.

Figure 2:
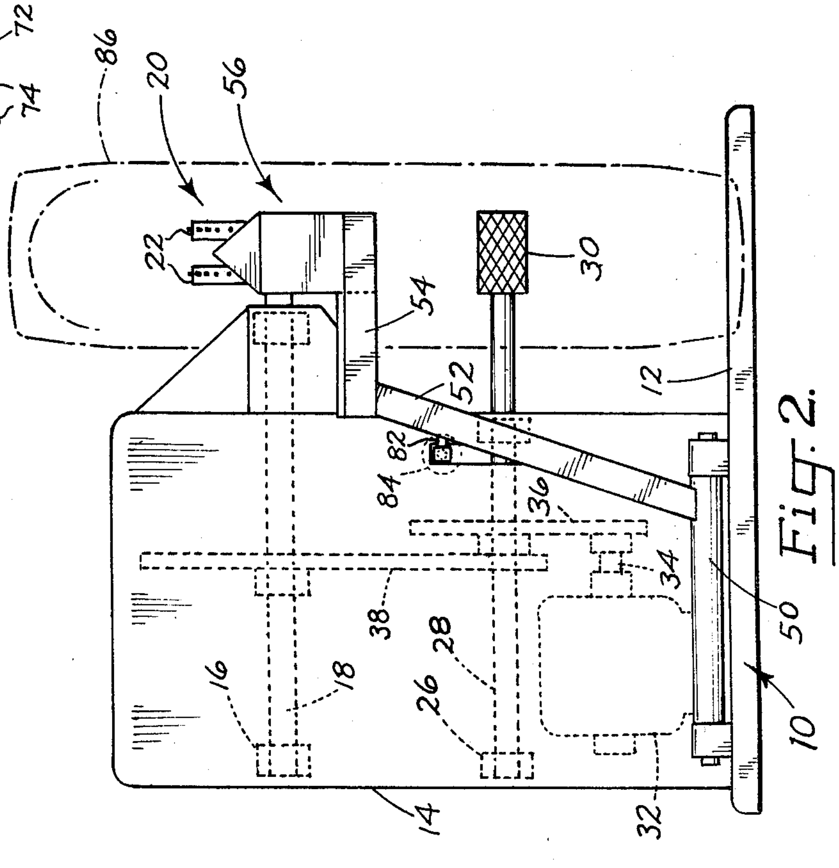
FIG. 2 is an end view of the apparatus illustrated in FIG. 1.

Explaining how the apparatus may be utilized in the cutting of a tire casing, the cutter and guide unit is swung to the left in FIG. 1, to permit the casing to be mounted with the cutter and guide unit inserted between the side walls and with arm 54 generally located within the spaced bounded by the inner circumference of the tire casing. The arm extends laterally of the guide means and cutter and carries the guide means and cutter at a point remote from the arm, which organization enables the arm to be circumscribed by the inside of the tire casing which is to be subjected to the cutting. With the tire casing so positioned, the mounting or bar 52 is swung to the right in FIG. 1 to swing the casing to the right and to place the crown of the casing in the cutting station, between roller means 20 which bears against the outside of the crown, and guide means 62 and the knife which bear on the inside of the crown.

This action is effective to start the cutting operation, with the crown of the casing now bearing on the two driven instrumentalities comprising roller means 20 and knurled roller 30. This causes the casing to revolve, with the knife element then moving into the inside of the crown. With the cutter or knife being yieldably urged to extend beyond guide wheels 64, penetration of the knife is controlled. As the casing revolves the knife cuts in a track, ultimately to work through the casing completely to sever it. Throughout the cutting operation regions of the casing, more specifically, regions of the crown on either side of that part of the crown which is being cut, are firmly held by the cooperative clamping action of guide wheels 64 working in opposition to spiked wheels 62.

Cutting edge 68 includes an inclined portion **68*a* and the incline of such portion is selected to provide a smooth slicing action as the cut progresses. The pressure of regulator 82 is adjusted so that for a given incline in portion 68*a*** penetration into the tire casing is sufficient to produce positive, speedy cutting, but not so great as to impede rotation of the tire casing under the driving torque available.

At the conclusion of the cut, the severed pieces of the casing fall aside and these are easily then removed by shifting bar or mounting 52 to the left in FIG. 1.

It should be obvious that the tire cutting apparatus contemplated has a number of novel features and advantages over those known in the prior art. For instance, the side profile of the cutter and guide unit where such enters into the tire casing may be kept relatively small, which greatly facilitates this initial insertion of the unit into the casing. Cutting of the inside of the crown is initially through the plies or reinforcing fabric of the casing, and with such cut, the rubber or elastomer on the outside of the crown is best opened up for further progressive cutting. A relatively wide expanse is provided for engagement by crown support means 20 and knurled roller 30 in producing a driving action for the casing. Throughout the cutting operation the casing, and ultimately the segments produced therefrom, are firmly held. The cutting pressure exerted by the cutter is controlled by the pressure maintained in ram 76.

While a preferred embodiment of the invention has been described, it should be obvious that modifications and variations should be apparent to one skilled in the art without departing from the invention.

It is claimed and desired to secure by letters patent:

1. Apparatus for cutting tire casings comprising a frame and crown support means on said frame for supporting one side of the crown in a tire casing in a cutting station in the apparatus, said crown support means accommodating movement of the crown through said cutting station while supported by said support means, guide means opposite said crown support means adapted to hold said crown against said support means while the crown moves through said cutting station, a cutter knife assembly adjacent said guide means, including a knife mounted for movement of an end thereof beyond said guide means and into the crown, and biasing means urging said movement of the cutter knife beyond said guide means, a movable mounting having said guide means and said cutter knife assembly jointly mounted thereon which is adapted to shift the guide means and knife assembly away from said crown support means, said mounting also mounting a deflector adapted for insertion between the side walls of a tire casing with such insertion producing deflection of the side walls away from each other as a preliminary to placing the inside of the crown against said guide means.

2. Apparatus for cutting tire casings comprising a cutter having a cutting edge, guide means adjacent said cutter adapted to bear against the inside of the crown in a tire casing, means urging relative extension of the cutting edge of the cutter beyond said guide means, an arm having said cutter and guide means mounted thereon which extends laterally of the cutter while carrying the guide means and cutter at a point remote from said arm and which is circumscribed by the inside diameter of a tire casing being cut by the apparatus, support means disposed substantially opposite said guide means and cutter for supporting the outside of the crown in a tire casing, and means for relatively shifting said arm and crown support means to accommodate loading of a tire casing into the apparatus.

3. The apparatus of claim 2, wherein said cutter comprises a knife with an end cutting edge and said guide means comprises a roller adjacent said knife, and said knife and roller are housed in housing structure in a region intermediate said arm and said end cutting edge.

4. The apparatus of claim 3, wherein said housing structure includes a deflector adapted for insertion between the side walls of a casing with such insertion producing deflection of the side walls away from each other as a preliminary to placement of the inside of the crown in said casing against said guide means, and wherein said means for relatively shifting said arm and crown support means comprises a movable mounting for said arm.

5. The apparatus of claim 2, wherein said cutter comprises a knife with an end cutting edge, said guide means comprises a roller adjacent said knife, and said means for relatively shifting said arm and crown support means comprises a movable mounting for said arm.

6. The apparatus of claim 5, wherein said crown support means comprises powered roller means engaging the outside of the crown.

7. Apparatus for cutting tire casing comprising a frame and crown support means on said frame for supporting the outside of the crown in a tire casing, said crown support means accommodating movement of the crown through said cutting station while supported by said support means, guide means opposite said crown support means adapted to bear against the inside of the crown and to hold said crown against said support means while the crown moves through said cutting station, a cutter knife assembly beside said guide means including a knife mounted for movement of an end thereof beyond said guide means and toward said crown support means thus to advance into the crown of a tire casing, and biasing means urging said movement of the cutter knife beyond said guide means.

8. The apparatus of claim 7, wherein said crown support means comprises powered roller means adapted to ride on the outside of the crown in a tire casing, and wherein said guide means comprises a pair of rollers disposed on either side of said knife adapted to ride on the inside of the crown in a tire casing.

* * * * *